Sept. 15, 1953  J. E. McEVOY  2,652,315
GAS ANALYZING DEVICES
Filed Feb. 8, 1951  2 Sheets-Sheet 1

INVENTOR.
JAMES E. McEVOY
BY
Raymond W. Junkins
ATTORNEY

Patented Sept. 15, 1953

2,652,315

UNITED STATES PATENT OFFICE 2,652,315

GAS ANALYZING DEVICES

James E. McEvoy, East Cleveland, Ohio, assignor to Bailey Meter Company, a corporation of Delaware Application February 8, 1951, Serial No. 209,952

3 Claims. (Cl. 23—255)

My invention is directed to improvements in gas analyzing devices. More particularly, my invention is embodied in structure which eliminates errors to which the prior art devices have been subject when employing a detecting element sensitive to variables in the analyzed gas other than the one desired of measurement.

Although the above generalization is true insofar as my invention is directed to the majority of analyzers having multiple-responsive detection elements, I direct an explanation of my invention to its embodiment in an analyzing system utilizing the principle of catalytic combustion of the detected constituents in the gas sample. The catalytic combustion is caused to take place on a heated filament whose electrical resistance varies with its temperature and tends to cause an incorporating network to unbalance to an extent proportional to the percentage by volume the burning constituents exist in the sample.

However, a detecting filament does not vary in temperature solely from the catalytic burning. The problem of analysis in this art would be greatly simplified if such were the case. The filament must have direct, intimate contact with all the constituents of the sample in promoting the catalytic combustion with the detected portion. Consequently, the specific heat, thermal conductivity, in short, all the influence of temperature variance of the sample come into play by conducting heat away from the filament at a rate which varies with the composition of the sample. The resistance of the filament, and consequently, the unbalance of the including electrical network, has not been, in the prior art, proportional solely to the percentage of the detected element in the sample but to a combination of this factor and the physical properties heretofore referred to of the sample as a mixture. Although the detected gas portion of the sample itself contributes to the extraneous and additional variation of the filament temperature by reason of its physical properties of specific heat and thermal conductivity, I will refer to the additional variation as attributable in a general sense to the inert constituents as a summary basis of reference. Thus, it is the effect on the final indication of gas analyzers by the variable inerts that my invention eliminates.

This desired refinement of analysis has been recognized by many patents in the prior art. In general two approaches have been made to attain this refinement in the prior art; either a compensating element in the electrical network has been established in the cell of the analyzing filament and rendered non-catalytic, or a separate cell has been provided to allow passage over the compensating filament of a heated inert gas approximating the physical characteristics of that passing over the analyzing filament. The disadvantages of these schemes are obvious; the compensating filament in the single analyzing cell would have to be coated, or made of, a substance which would render it non-catalytic with consequent non-parallel response with the measuring filament to the physical characteristics of the inerts, or it is impractical to flow through the separate compensating cell an inert which has a parallel variation in its physical characteristics with those of the medium flowing through the analyzing cell.

An example of companion cell compensation structure is to be observed in at least the disclosure of the patents to Sullivan 2,197,370 and 2,404,993 while there are other patents such as Morgan et al. 2,211,627, 2,204,966, and 2,273,981 which coat with, or construct the compensating filament of, a substance which is non-catalytic. The patents to Miller 2,083,521 and Sullivan 2,310,472 are of interest in their recognition of this problem, but these patents do not solve the problem as does the applicant. The applicant is convinced that he is the first inventor in this field to employ identical filaments in combination with structure which simultaneously renders only one of them effectively catalytically active with the sample gas while both of them are rendered proportionately responsive to the variable physical characteristics of the inerts of the gas sample.

I have as a primary object with my invention the compensation of gas analyzing devices that the final record is solely representative of a particular variable.

Another object of my invention is the elimination of extraneous variables from the analysis of catalytic combustion gas analyzers.

Another object is the maintenance of a consistent proportion between the effects exerted upon two opposed, responsive elements of a gas analyzer by the variables of the analyzed gas.

Another object is the maintenance of a consistent proportion between the effects simultaneously exerted upon two opposed elements in the balanceable electrical network of a gas analyzer by the physical variables of the analyzed gas.

A further object of my invention is the compensation of a catalytic combustion gas analyzer to eliminate from its final record the variation caused by the physical properties of the constituents in the analyzed sample.

Figure 1:
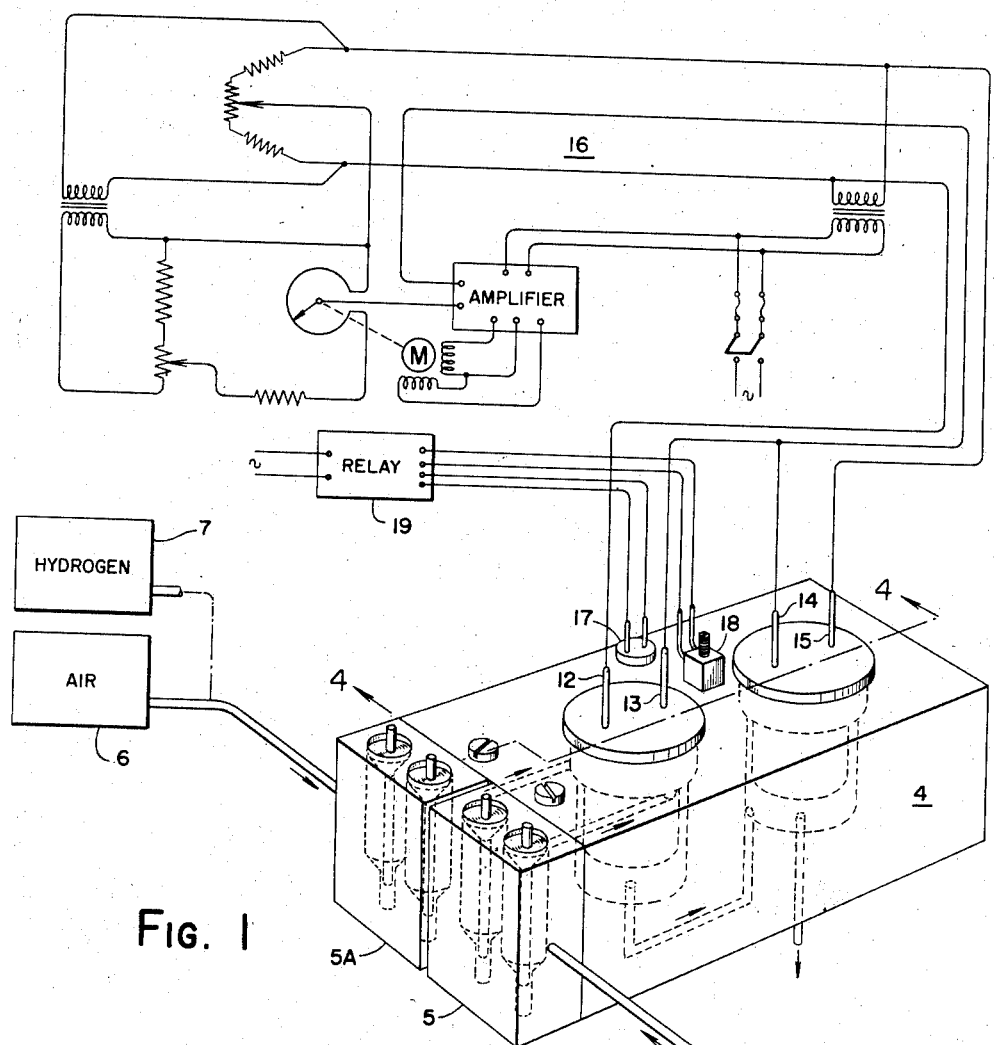
Fig. 1 is a perspective and diagrammatic layout of units of an analyzer embodying my invention.

Referring to Fig. 1, I have shown therein, somewhat diagrammatically, the basic units of an apparatus combination capable of analyzing a gas sample for either its combustible constituents or for free oxygen. The gas sample is cleaned and prepared for analysis by an apparatus not shown here but well known in the art. I have shown a gas sample tube 1 through what might be a furnace wall at 2 for the initial extraction of the sample to be prepared for analysis. The apparatus for causing this extraction as well as that for cleaning and preparing it for entry to the analyzing apparatus is to be visualized as incorporated at some point along passage 3.

A base housing 4 forms the specific locus for novel structure I am to disclose and itself has a desirable function other than mere support of the various element combinations. Preferably this housing is of a metallic material to give a large heat storage for insulating the responsive elements of the analyzer from ambient temperature variations. As will be readily observed with perspective comprehension of the function of my invention, and from my subsequent discussion, the provision of this base housing to eliminate the effect of ambient temperature variation on the responsive elements is an important step in securing the improved results of my invention.

Two sets of flow valves are housed in the metallic blocks 5, 5A. These metallic blocks are attached to housing 4 and comprise valves which may be similar to the regulators of the patent to Johnson 2,438,973 and serve here to maintain the gas sample flowing into my analyzer at a constant rate. Again I have freely used the diagrammatic method to represent an air supply from a source 6, or hydrogen from a source 7, to one of the valve blocks 5A.

In the instance where it is desirable to analyze for combustibles such as carbon monoxide, hydrogen or methane it is customary to supply sufficient air to burn these constituents on a catalytic filament. Where it is desirable to determine the free oxygen content of the sample, it is customary to supply a medium such as alcohol vapor or, as here, hydrogen for combination in the catalytic process at the filament with the free oxygen in the sample. In either type of analysis the regulators in blocks 5, 5A supply the sample and combustion supporting medium to the responsive filaments at a constant rate.

With initial consideration given to the size of signal needed for utilization by an electrical network 16, the filaments and their retaining cells are somewhat mechanically determined in size. Then the rates of flow required for the sample and air or hydrogen into the cells are precisely determined and fixed by orifices 9.

Location of the orifices is made in the housing-block 4. With the passages for the sample and hydrogen or air of sufficient length, the temperature of the gases is kept at a constant level as they are metered through the orifices 9. The block not only heats the gases to a common, consistent, temperature but maintains the orifice structures themselves unchanging by reason of their retention within the block-housing.

The responsive filaments are in cells 10 and 11 which are located in the top of housing 4 and have terminals 12, 13 and 14, 15 for external inclusion into the conventional measuring electrical network. The network, shown diagrammatically at 16, essentially comprises the familiar Wheatstone bridge having the two filaments as opposed legs and associated apparatus familiar in the art. One of the filaments is the analyzing element in that the primary catalytic combustion with the analyzed constituent of the sample is caused to take place thereon. The other filament is compensating in that its response is matched with the portion of the response of the analyzing filament due to extraneous variables of the sample. It is the novel structure of my invention which maintains this matching throughout a practical range of measurement.

The unbalance of the including electrical network 16 represents the variable for which the analysis is conducted and the rebalancing action serves to continuously represent this variable as a visual record. These balanceable networks are not only well known in this and other arts but also the means to rebalance them and indicate or record the rebalancing action.

Finally, the block-housing 4 is maintained at the elevated temperature which will eliminate the effect of ambient temperature fluctuations on the structure and gases within the housing. Heater 17 is conveniently recessed into the block and is placed under control of thermostat 18 by means of relay 19. Also, the temperature level insures, during oxygen analysis particularly, that water formed during the catalytic combustion will not collect in the cells and vary the temperature of the filaments. The suspending of the filaments down into the cells is further insurance that collected liquid will not rise to the filament body except under exceptional conditions. It should now begin to impress a student of this art that I have taken adequate steps, by my arrangement, to safeguard that the variation in temperature between the measuring and compensating filament will be solely a function of the degree of catalytic combustion on the measuring filament. The elevated heating of this housing 4 provides an important step in the safeguarding.

Figures 2, 3:
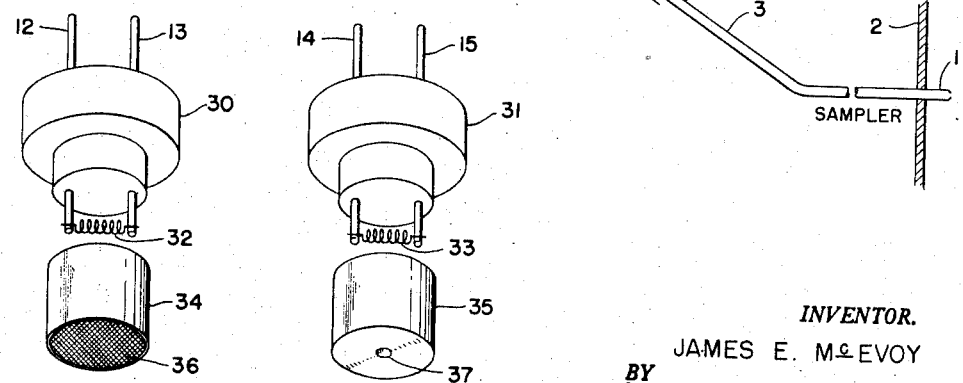
Fig. 2 is an exploded perspective view of the analyzing element and its mounting.
Fig. 3 is an exploded perspective view of the compensating element and its mounting.

Figs. 2 and 3 are offered to show the essential structure of the filament supports and novel elements associated therewith. In both cells insulating bases 30 and 31 support the terminals and the filaments 32 and 33. Shields, or shells, fit over these filaments and serve to prevent direct impingement on the filaments of the sample gas. Shield-shell 34 fits over the analyzing filament 32 and attaches snugly to its base 30. It also carries a fine metallic mesh screen 36 to complete the enclosure of filament 32 therein. Shield-shell 35, however, is complete in itself with the exception of a small aperture 37 through with access to the compensating filament 33 is gained. The sample gas does not flow over the filaments as in so many prior art devices but is introduced tangentially from the walls of cells 10 and 11 and near the base of shells 34 and 35. Tangential introduction swirls and thoroughly mixes the streams coming into the cells, around and along the outside of the shells. Exit of the mixture from the cells occurs at their ends opposite the introduction point and that portion of the mixture which actually reaches the filaments is accomplished by the phenomena of diffusion, common to gases.

Figure 4:
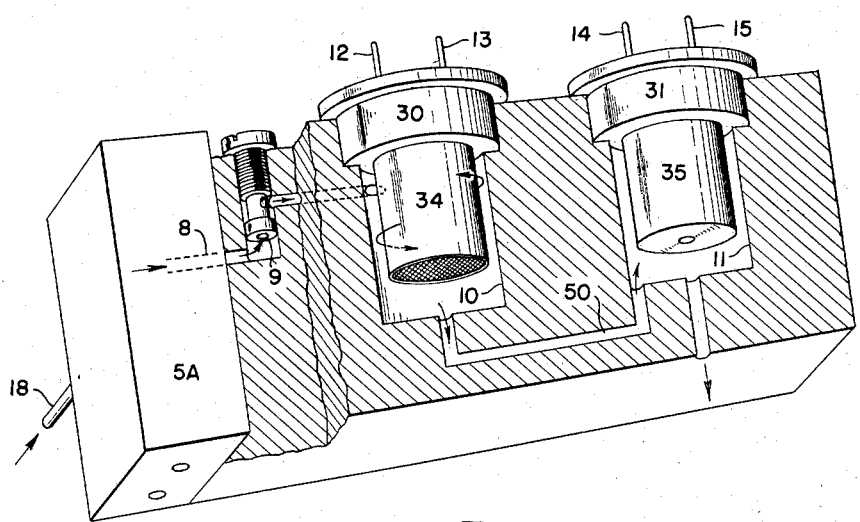
Fig. 4 is a diagrammatic illustration of the flow path of analyzed gas through the analyzer.

To follow through on an understanding of the function of my novel structure, it will be advantageous to refer to Fig. 4 wherein I have shown to better advantage the flow of the sample and air or hydrogen through the cells 10 and 11. Although difficult to show diagrammatically, the sample and air or hydrogen from passages 3 and 8 are introduced, as heretofore explained, into cell 10 near the upper base of shield 34. Exit of the cell contents occurs through passage 50 which conducts the resulting mixture into cell 11. As the mixture to be analyzed reaches the bottom of shield 34 covered by screen 36 a definite amount diffuses through the screen up to the analyzing filament. The balanceable network is energized so as to maintain the initial temperature of the analyzing filament at a predetermined level. In my particular structure it has been found desirable to maintain this filament temperature in the neighborhood of 1300 F. This temperature is sufficient, combined with the rate of passage of the analyzed gas over the filament by diffusion through screen 36, to give a catalytic ignition for elevation of the temperature of the filament to satisfactorily unbalance the electrical network into which it is incorporated when the constituent to be determined is methane. The other common combustible commonly analyzed, such as carbon monoxide and hydrogen, are also easily burned at this combination of filament temperature and rate of passage over the filament. Therefore, there results a catalytic action over a wide range of constituents commonly desired of analysis.

The mixture of gases leaving cell 10 through passage 50 is composed of not only air or hydrogen but much of the sample gases which never actually came in contact with the compensating filament as well as the resulting products of the catalytic combustion at the filament which diffuse downwardly through the screen and out of the filament-containing shell.

The object of my novel structure is to prevent catalytic combustion on the compensating filament 33 which is identical in structure to analyzing filament 32 but at the same time to subject it to the cooling influence of the physical properties of the sample and products of catalytic combustion. This desired result is obtained very satisfactorily by greatly limiting the rate of diffusion to the compensating filament by means of the small aperture 37 in shield 35. The rate of diffusion to the compensating filament is reduced so drastically by aperture 37 that insignificant catalytic combustion occurs on the surface of this filament while at the same time the rate of diffusion maintains a passage of the mixture from passage 50 over the compensating filament which is proportional in rate to that over the measuring filament. As all the physical properties of the sample and air or hydrogen as well as the products of catalytic combustion have a cooling effect on the measuring filament, simultaneous with its temperature elevation due to catalytic combustion, the same effect is maintained proportionately upon the compensating filament. With proportionality in effects on the opposed sensitive bridge elements of circuit 16 with the exception of the raised resistance of the measuring filament 32 due to the catalytic combustion thereon of the analyzer constituent, the resulting unbalance of the network truly reflects the percentage by volume this constituent exists in the analyzed sample.

Figure 5:
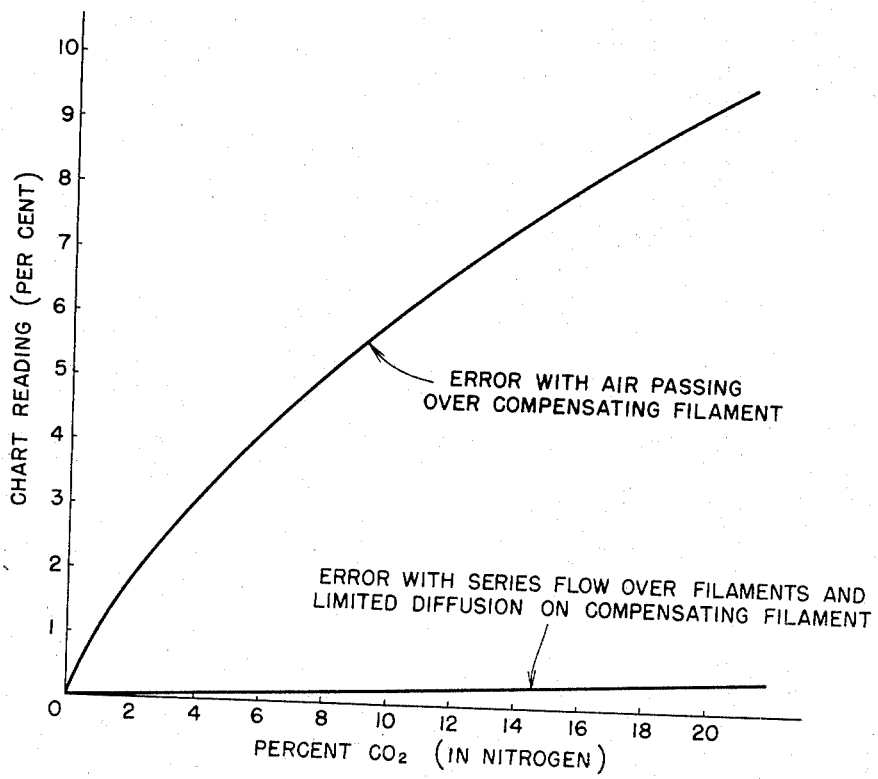
Fig. 5 is a chart of comparative performance values for an analyzer employing, and not employing, my invention.

Fig. 5 is presented to graphically illustrate the effectiveness of the novel structure of my invention. To obtain the comparative results shown on this graph of Fig. 5, nitrogen with controlled amounts of $CO_2$ by volume was introduced into cell 10 of its analyzing filament while air was passed through the cell 11 with its compensating filament. As the percent $CO_2$ was increased in cell 10, the unbalance of the network increased as shown by curve 1 and thereby illustrated the effect of the physical characteristics of such an inert constituent in the sample. The test results were illustrated very practically in percent of chart indication being plotted versus the percent of $CO_2$ increase in the nitrogen.

My novel structure was then employed in that nitrogen with the same percentage of $CO_2$ variation was passed through cells 10 and 11 in series and the resulting unbalance is illustrated by curve 2. Undoubtedly my invention provides that the physical effects of inert gases will have proportional effects upon the analyzing and compensating filaments and its use results in no appreciable unbalance of the network which cannot be eliminated by a constant, mechanical calibration of the indicator linkage.

Although I have used, in illustration, only one form my invention may be given in practical embodiment, I maintain the scope of my invention will be measured only by the appended claims.

What I claim as new, and desire to secure by Letters Patent of the United States, is:

1. In a catalytic gas analyzer; a pair of filaments physically substantially identical and both adapted to cause combustion at their surfaces when heated; an electrical network including both filaments and energized to heat both filaments to substantially the same temperature; a metallic block housing for the filaments including, a first cell cavity receiving a first of the filaments, a second cell cavity receiving the second of the filaments, a first passage arranged to introduce a sample of gas to be analyzed tangentially into the first cell cavity, a second passage arranged to introduce a combustion supporting fluid tangentially into the first cell in direction of flow opposite to the direction of flow of the gas sample, a third passage between the cell cavities for the mixture of gas and combustion supporting fluid, an exhaust passage from the second cell cavity, and means for maintaining the entire block structure above ambient temperature; means connected with the passages for maintaining the combustion supporting fluid and gas sample under constant pressure into the first and second passages; a shield surrounding and completely enclosing said first filament located within said first cell cavity, said shield having in one end thereof a large cross-sectional area opening permitting the fluid and gas mixture access to the first filament by diffusion; and another shield surrounding and completely enclosing said second filament located within said second cell cavity, said shield having in one end thereof a small cross sectional opening permitting the fluid and gas mixture restricted access to the second filament by diffusion.

2. In a catalytic gas analyzer; a metallic block housing including; regulators in the housing block for maintaining fluid into the block under constant pressure, first and second cylindrical cell cavities in the block, a first passage arranged to introduce a sample of gas to be analyzed from the regulators into the first cell cavity closely adjacent one end thereof and tangential to the cavity wall, a second passage arranged to introduce a combustion supporting fluid from the regulators into the first cell cavity closely adjacent the same one end of said first cell cavity the gas sample is introduced and tangential and opposite in flow direction to that of the gas sample, a third passage from the other end of the first cell cavity to the second cell cavity, an exhaust passage from said second cell cavity and an electrical heater for controlling the block temperature; a first shield within the first cell cavity, said first shield having in one end thereof an opening of large cross-sectional area; a second shield within the second cell cavity, said second shield having in one end thereof an opening of small cross-sectional area; identical filaments located within each shield and completely enclosed thereby; and an electrical network including the filaments for heating them to the same temperature.

3. The analyzer of claim 2 with removable orifice structures in each of the first and second passages.

JAMES E. McEVOY.

References Cited in the file of this patent
UNITED STATES PATENTS

| Number | Name | Date |
|---|---|---|
| 1,459,127 | Williams | June 19, 1923 |
| 1,900,884 | Lusby | Mar. 7, 1933 |
| 2,037,409 | Duvander | Apr. 14, 1936 |
| 2,083,521 | Miller | June 8, 1937 |
| 2,084,954 | Griswold | June 22, 1937 |
| 2,197,370 | Sullivan | Apr. 16, 1940 |
| 2,204,966 | Morgan et al. | June 18, 1940 |
| 2,211,627 | Morgan et al. | Aug. 13, 1940 |
| 2,310,472 | Sullivan | Feb. 9, 1943 |
| 2,369,811 | Stuart | Feb. 20, 1945 |
| 2,378,019 | Jacobson | June 12, 1945 |
| 2,404,993 | Sullivan | July 30, 1946 |
| 2,438,973 | Johnson | Apr. 6, 1948 |

OTHER REFERENCES

Daynes: "Gas Analysis by Measurement of Thermal Conductivity," pages 126–134 (1933), printed in Great Britain at the University Press, Cambridge.